United States Patent
Kassab et al.

[11] Patent Number: 6,017,175
[45] Date of Patent: Jan. 25, 2000

[54] VEHICLE LOAD DIVIDER

[75] Inventors: Gabe M. Kassab, Pittsburgh; Howard Chabassol, Hermitage, both of Pa.

[73] Assignee: Kasgro Rail Corp., New Castle, Pa.

[21] Appl. No.: 09/167,147

[22] Filed: Oct. 6, 1998

Related U.S. Application Data

[62] Division of application No. 08/747,362, Nov. 12, 1996, abandoned.

[51] Int. Cl.⁷ .......................................................... B60P 7/14
[52] U.S. Cl. ............................. 410/131; 410/87; 410/46; 410/142; 410/140; 410/119
[58] Field of Search ..................... 410/119, 129, 410/131, 140, 141, 142, 146, 87, 88; 49/68, 394; 296/24.1; 220/529, 531

[56] References Cited

U.S. PATENT DOCUMENTS

| | | | |
|---|---|---|---|
| 2,516,527 | 7/1950 | Oltz | 410/131 X |
| 2,674,207 | 4/1954 | Kerbaugh et al. | 410/131 |
| 3,017,843 | 4/1962 | Loomis et al. | 410/131 |
| 3,029,747 | 4/1962 | Shaver | 410/131 |
| 3,073,261 | 1/1963 | Oglesby | 410/131 |
| 3,115,977 | 12/1963 | Mirando | 410/119 X |
| 3,427,997 | 2/1969 | Brown, Jr. et al. | 410/119 |
| 3,753,414 | 8/1973 | Enochian | 410/119 |
| 3,847,091 | 11/1974 | Holt | 410/119 |
| 5,085,382 | 2/1992 | Finkenbeiner | 244/118.1 |

FOREIGN PATENT DOCUMENTS

| | | | |
|---|---|---|---|
| 688803 | 6/1964 | Canada | 410/131 |
| 317375 | 5/1989 | European Pat. Off. | 410/87 |
| 10789 | 7/1900 | United Kingdom | 220/529 |

*Primary Examiner*—Stephen T. Gordon
*Attorney, Agent, or Firm*—Buchanan Ingersoll, P.C.

[57] ABSTRACT

A cargo load dividing apparatus utilizing a pivotal gate which pivots from the side of the vehicle to extend generally transversely into a cargo area. The gate is lockable into the transverse position by engaging a gate locking assembly with the floor of the vehicle. Embodiments include those having metallic, cushioned and airbag surfaces adjacent the cargo. Systems in using plurality of gates on a single vehicle can use one or more gates extending partially along with width of the vehicle. Gates may be pivoted into a locked transversed position or be pivoted into a position adjacent the side wall of the vehicle.

14 Claims, 10 Drawing Sheets

*FIG 1a*
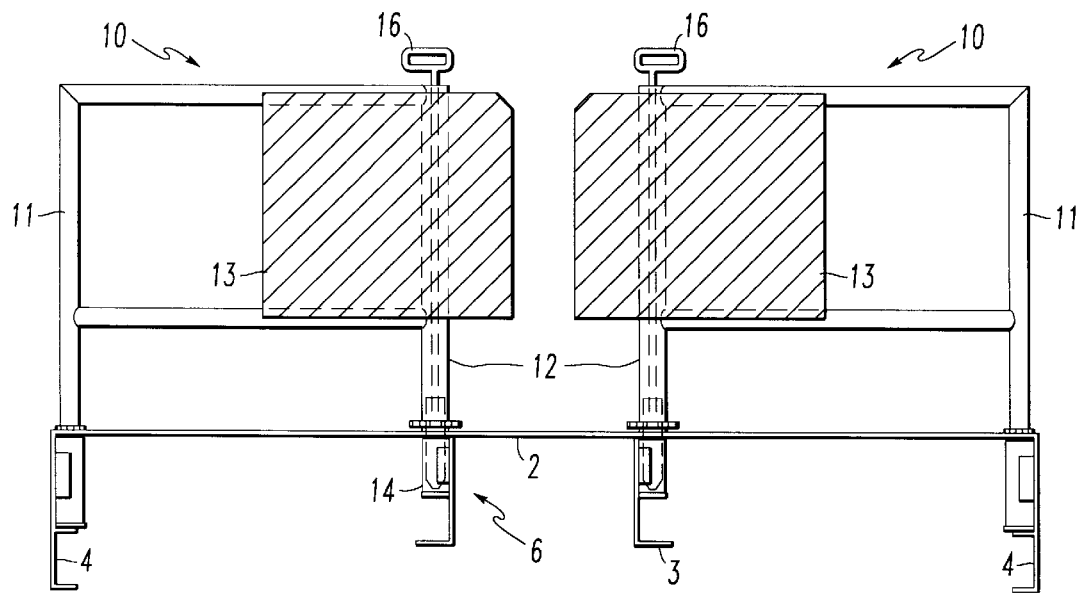
*FIG 1b*
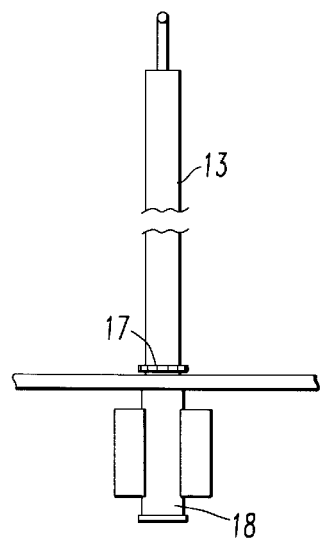
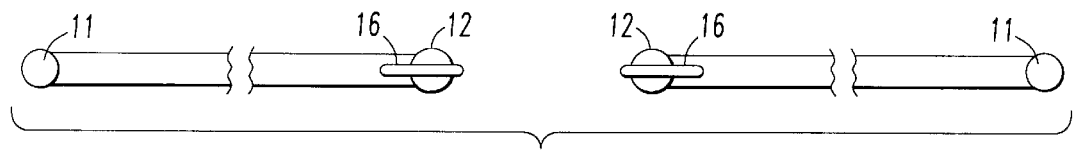
*FIG 1c*

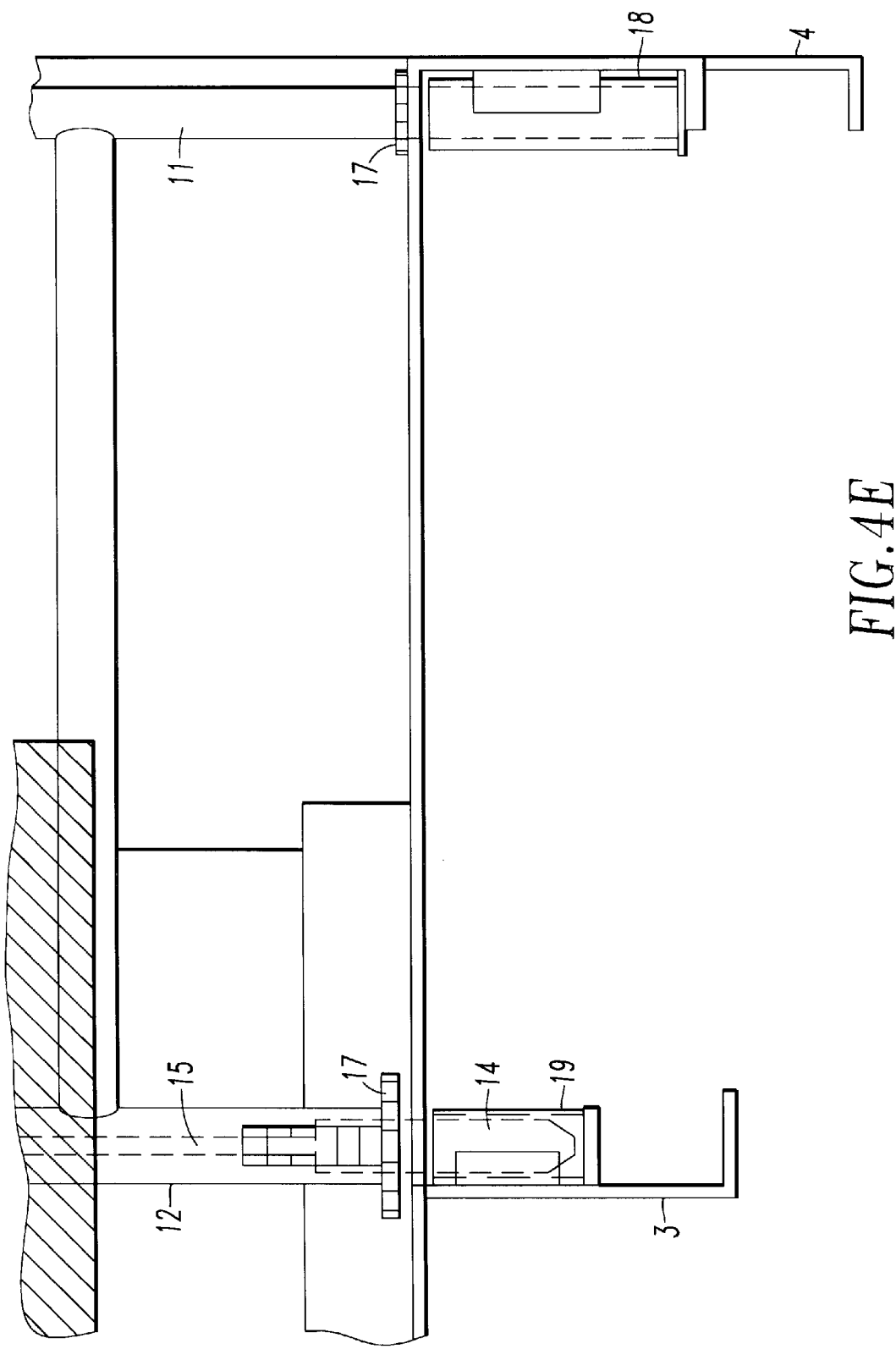

VEHICLE LOAD DIVIDER

RELATED APPLICATION

This application is a Divisional Application of U.S. patent application Ser. No. 08/747,362, filed on Nov. 12, 1996, and abandoned on Dec. 2, 1998.

FIELD OF INVENTION

This invention relates to an apparatus to protect and restrict cargo movement during transportation. It is specifically adapted to use in large open cargo areas such as found on railway freight cars.

BACKGROUND OF INVENTION

In transporting cargo of many varieties, it is often common to use a vehicle that has basically a large cargo area, such as a railway freight car or an over-the-road tractor trailer truck arrangement. Such vehicles are commonly used because of their flexibility and adaptability to handle a variety of cargo. However, because of the generally open nature of the cargo space, such vehicles often do not lend themselves to securing, protecting, or isolating specific cargo needs. It is therefore desirable to have a method or apparatus to partition an open cargo area into a smaller cargo area more specifically capable of handling the shipping requirements of individual cargo items. Often times cargo, such as steel coils, paper or coils of soft metals like aluminum or electrical cable can be damaged by contact with portions of the vehicle or between other coils inside the vehicle during transit. It is one of the objects of this invention to provide an easy to use apparatus and method for dividing an open cargo area into a number of partitions, specifically to meet the needs of a given cargo item. Such load division can be sufficiently flexible and adaptable so as to provide partitioned areas to fit a variety of sized items within a mixed cargo or to fit a large number of similar items on board a single vehicle.

SUMMARY OF THE INVENTION

The problems associated with transportation of cargo in open cargo areas can be solved by the utilization of a system of pivotal gate assemblies which can be pivoted to a position generally adjacent the side walls of the vehicle, and alternatively pivotal to a position generally transverse to the side wall of the vehicle so as to accommodate variations in specific cargo size. Individual gates are maintained in a transverse position by a portion of the gate being engageable with abutting surfaces in the floor of the vehicle. In some embodiments the pivoting is about a post positioned generally adjacent to the side wall of the vehicle, and in other embodiments the pivoting is about a hinge joint between the wall of the vehicle and the divider gate. The engagement between the locking member of a gate and the vehicle floor includes a pocket or bore in the floor in which a locking pin can be extended from the gate to engage the pocket. The surface of the gate adjacent to the cargo has provision for protecting and supporting the cargo, and can include a metal plate or barrier, a protective barrier or pad, or pneumatic cushioning elements such as inflatable airbags.

BRIEF DESCRIPTION OF FIGURES

FIG. 1a is an elevational view shown in partial cross section of a dual gate apparatus as applied to a freight car.

FIG. 1b is a partial cross section of a lifting handle arrangement and its engagement with the car floor as shown in FIG 1a.

FIG. 1c is a top view of a twin gate arrangement as depicted in FIG. 1a.

FIG. 2b is a side view of the locking pin arrangement similar to that shown in FIG. 2a.

FIG. 4e is an elevational view in partial cross section of a pivotal single door arrangement.

FIG. 6b is a top view of the assembly of FIG. 6a.

FIG. 6c is a partial cross sectional view of the rectangular locking pin arrangements of FIG. 6a.

FIG. 7b is a side view of the locking pin arrangement of FIG. 7a.

DESCRIPTION OF SOME EMBODIMENTS

Figure 2A:
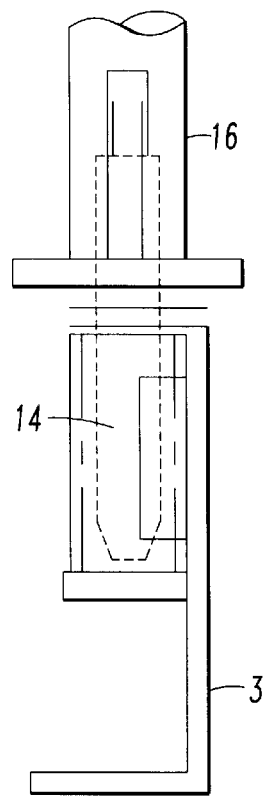
FIG. 2a is a detailed view shown in partial section of the locking pin arrangement and its engagement with portions of the vehicle floor.

FIGS. 1 through 7 show a number of views of embodiments of the present invention as it may be utilized on a railway freight car. Other embodiments can be utilized on highway vehicles or in other transportation situations as will be readily apparent from a review of these drawings.

In a typical rail freight car installation two gate load dividers may be installed to create an in-line partition. In other freight applications a single gate divider can be used. In single gate applications the gate may extend the full width of the cargo area or only a portion, such as generally ½, ¾, etc. A plurality of mounting assemblies such as pivot sockets and pin housings 18 and 19, respectively, as shown in FIG. 4e may be utilized. In some embodiments the gate may be hinged from a wall. The load divider can be either positioned adjacent the wall by pivoting on the hinge or on end post 11, within the pivot socket 18 or alternatively it can be swung into a position which will often be generally perpendicular to the side wall of the vehicle, such as shown in the overhead views. When it is in the gate position, such as shown in FIG. 1a, the locking pin 14 engages an aperture in the pin housing 19 to secure the gate 10 to prevent rotation and longitudinal movement of the cargo. As can be seen in overhead views of the vehicle, such as FIG. 4d, individual coils of material, such as aluminum or other commodities, can be shipped in a separated manner. The load divider gate 10 may have a plate 13 affixed to one or both sides to add rigidity and strength. In addition, certain materials such as wood, fabric, plastics, or other cushioning materials may be either permanently or temporarily attached to the gate dividing assembly to further protect the commodities. By having a locking assembly such as the pin and pin assembly, an operator may easily disengage the pin by the handle and rotate the gate to remove cargo or to position the gate when a partitioned shipping scheme is not desired. It is to be understood that the drawings attached to this application show only some specific embodiments of this invention. Other embodiments are apparent from a review of these drawings and are included with the scope of this application and the patent protection afforded by any patent being granted based upon this application. Some dimensions have been shown. These are only presently preferred dimensions, other dimensions can easily be adapted so that the invention may fit vehicles of different heights, widths, and cargo capacities.

Figure 2B:
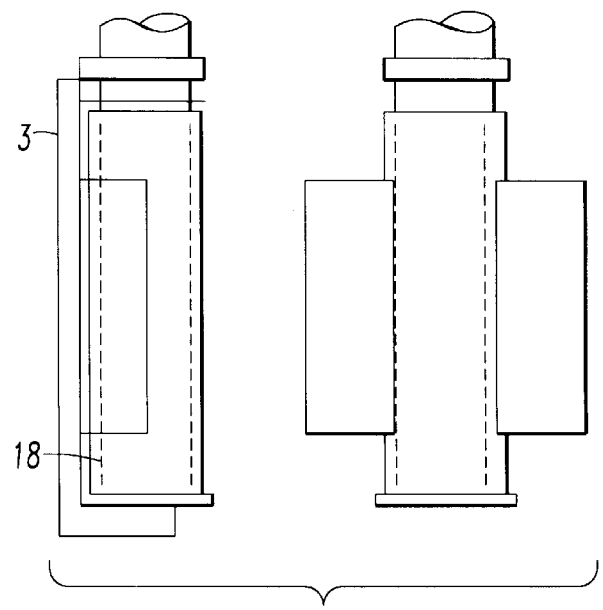
Figure 3:
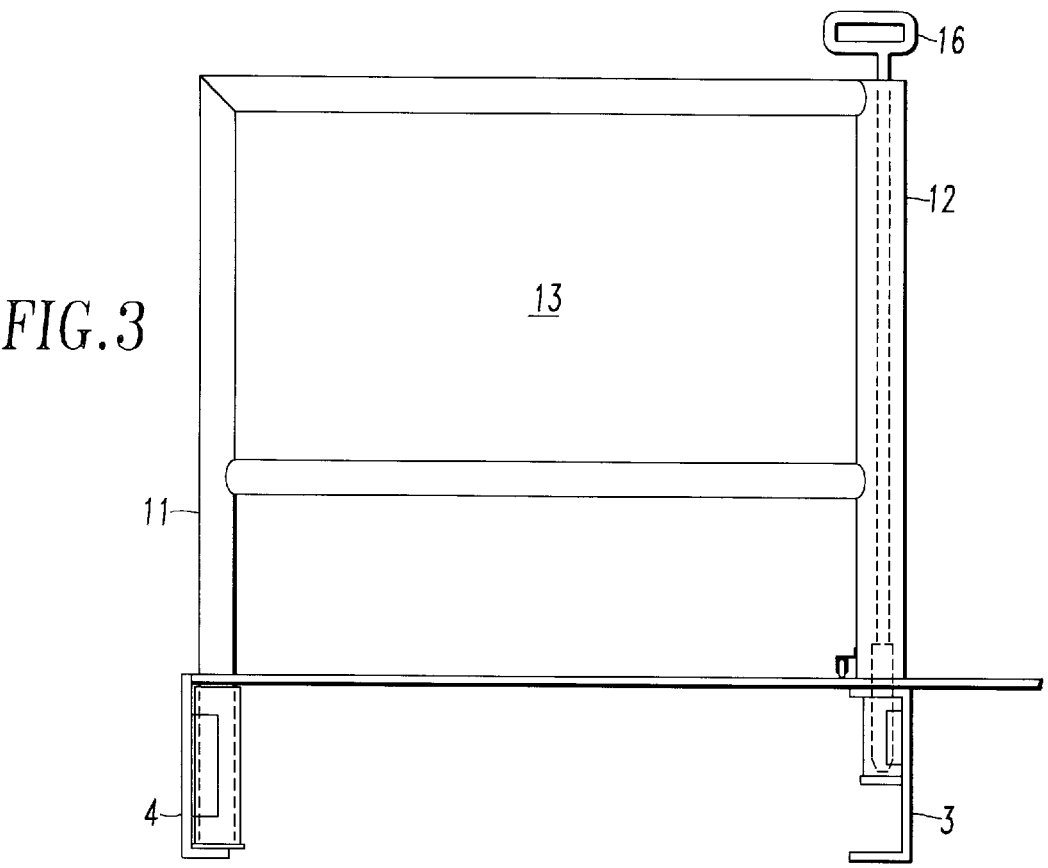
FIG. 3 is a partial elevational view of a single gate arrangement of an embodiment having a pivotal member on one side pivoting about a floor engaging portion.
Figure 5:
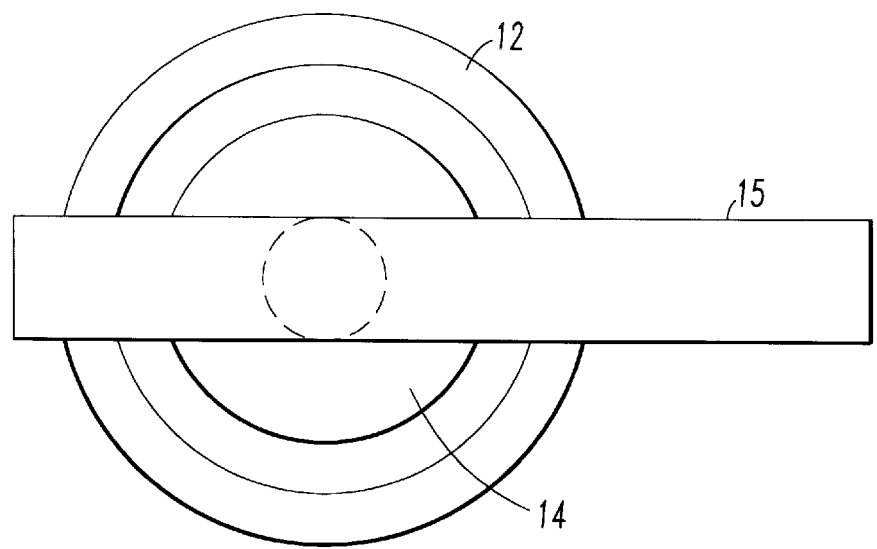
FIG. 5 is a diagrammatic arrangement showing a generally circular embodiment of a lifting pin assembly.
Figure 4A:
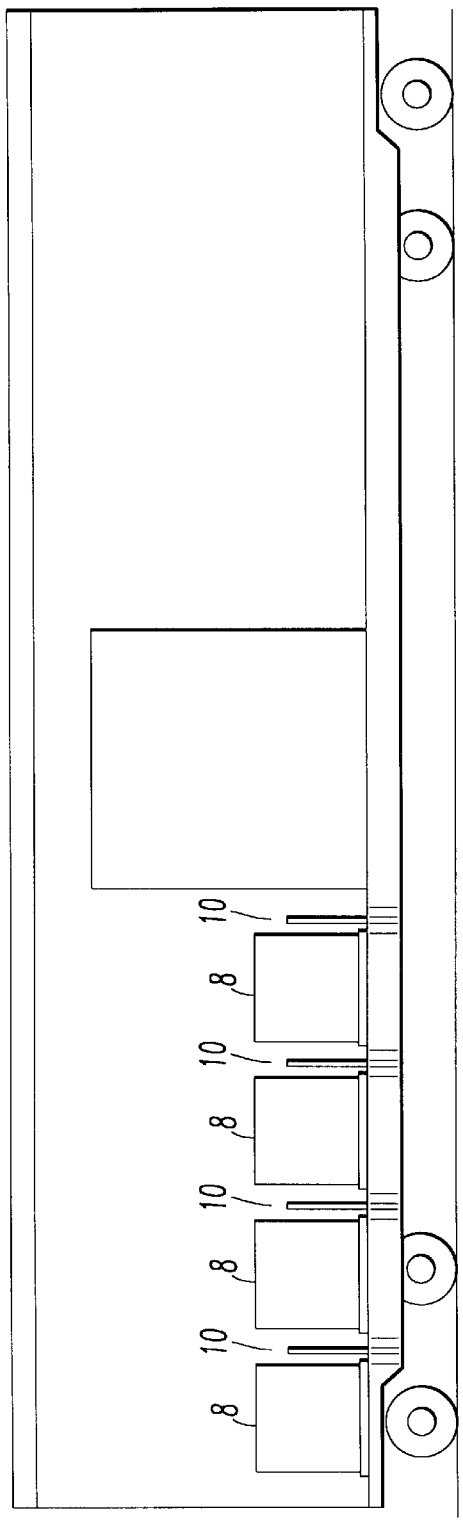
FIG. 4a shows a diagrammatic representation of a four gate assembly as utilized in a freight car.
Figure 4B:
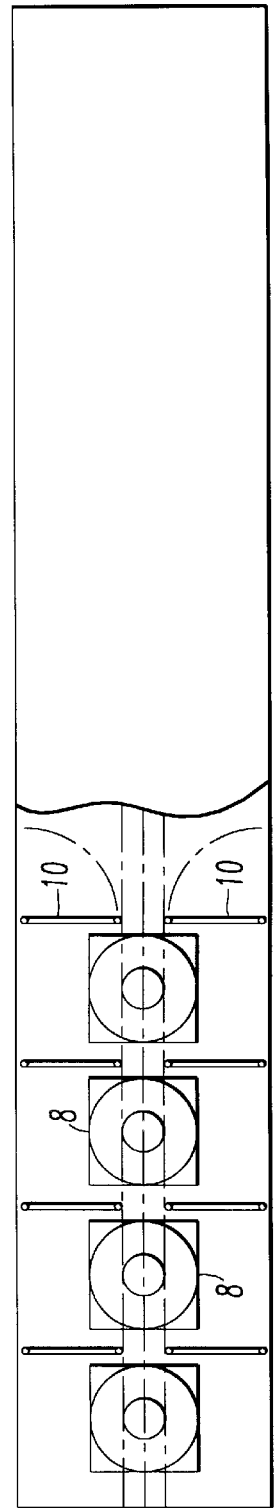
FIG. 4b shows a plan view similar to the arrangement shown in FIG. 4a in which eight gates are used to partition cargo areas in a vehicle.
Figure 4C:
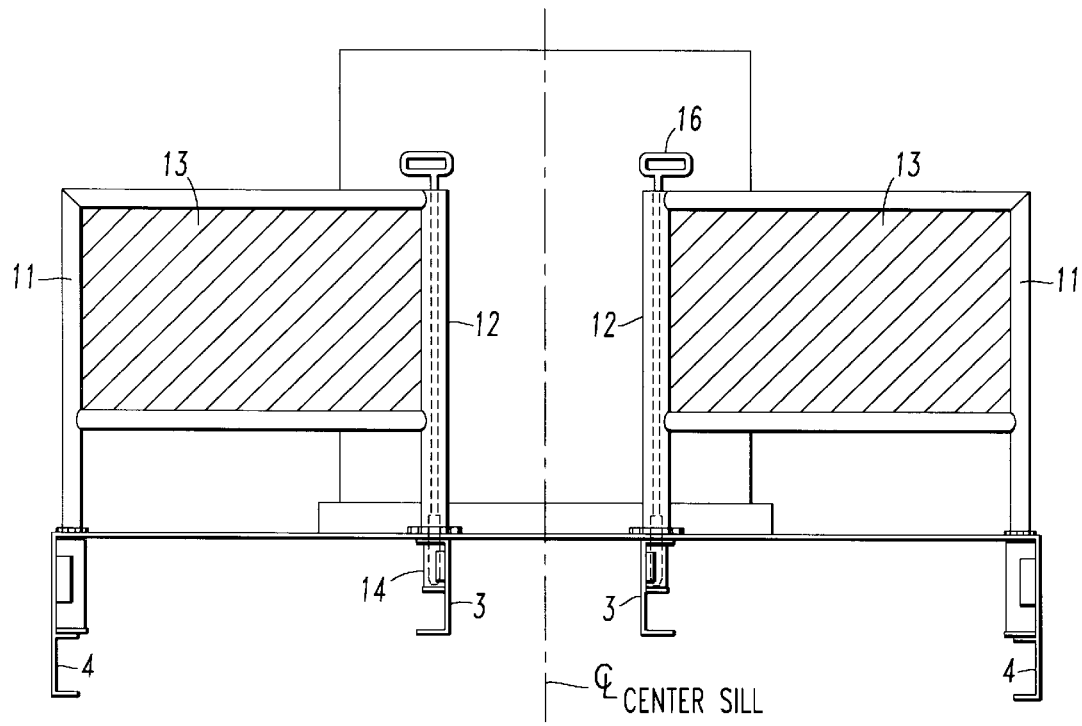
FIG. 4c shows an elevational view in partial cross section of a two gate wide arrangement.
Figure 4D:
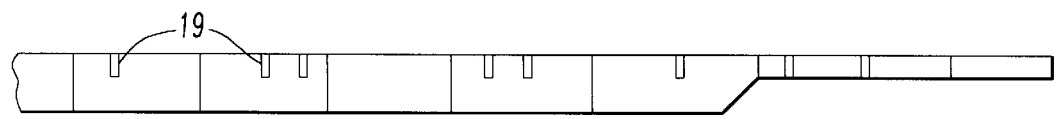
FIG. 4d shows an adjustable location arrangement in a freight vehicle.

A review of FIG. 1 shows the load divider 10 having an end post 11 and a center post 12. These posts are spaced from each other and connected intermediate by two lateral supports which may be tubular pipe or may be omitted altogether and only a steel plate used. In some instances a steel plate 13 may be used for added support and to increase the length, height, width, etc. of the divider. In operation, the load divider 11 can be pivoted by unlocking the handle 16 which causes the locking pin 14 to be retracted from the pin housing which is mounted in the floor of the car. The pin housing assembly may have a protective rectangular plate on the floor area with a more rigid structure welded or otherwise secured to a structural member, such as the center sill 3. When the load divider is unlocked by disengaging the pin, it can then be rotated from a transverse position to a position generally parallel to the side wall of the vehicle. A collar 17 can be placed on the end post or the center post to add support. A locking assembly in the center post causes the pin to be raised and lowered with regard to the handle or other unlocking means. In some embodiments it will be desirable to use merely a gravity operation for the pin engagement with the pin housing 19. In other embodiments it may be desirable to add a spring loaded mechanism in the locking assemble to bias the pin into engagement such that when the gate is installed in its transverse direction the spring tension will keep the pin in the lock position. As can be seen in FIG. 1a, the individual load dividers 10 on the right-hand side and 10 on the left-hand side may be made identical. As such they may be rotated in either direction when they are unlocked so as to rest against the adjacent vehicle side wall. FIGS. 2a and 2b give more detail of the end of the center post and the end post. FIGS. 4a through 4e show details of the preferred apparatus as it is installed in a vehicle.

While one locking mechanism and an associated release handle are shown, it is to be understood that other similar methods to lock the non-pivoting end of the gate divider are also included within the scope of this invention. While the presently preferred method uses a handle on the top of the gate mechanism, other handles, levers, or unlocking means are equally included within this invention. Such other unlocking means will be easily adapted to the specific application and model of vehicle on which it is desired to use this invention.

Similarly, it is to be understood that the invention includes the device and methods wherein a plurality of such gates are used in conjunction with an array of mounting assemblies for both the pivot end and the locking end of the divider. In such applications it may be desirable to have the whole gate divider be easily removable by vertically lifting the pivot end out of its assembly and inserting it into one of the adjacent assemblies to provide a specific cargo fit. Similarly, hinged gates can use a multiplicity of half hinges mounted on the vehicle side walls. While the examples shown in this application contemplate the use of two gates arranged in a common plane extending generally perpendicular from the side walls of the vehicle, it is also contemplated that a single gate may be used in some vehicles wherein the pivot post is mounted on the vehicle adjacent a side wall and the locking assembly is mounted on the floor or decking on the opposite wall. This permits a single gate to transverse the major distance between the walls of a cargo vehicle.

Figure 6B:
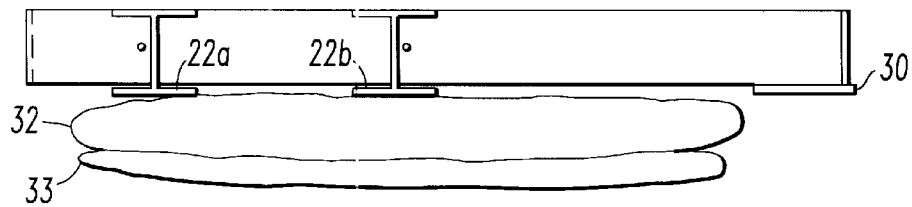
Figure 6A:
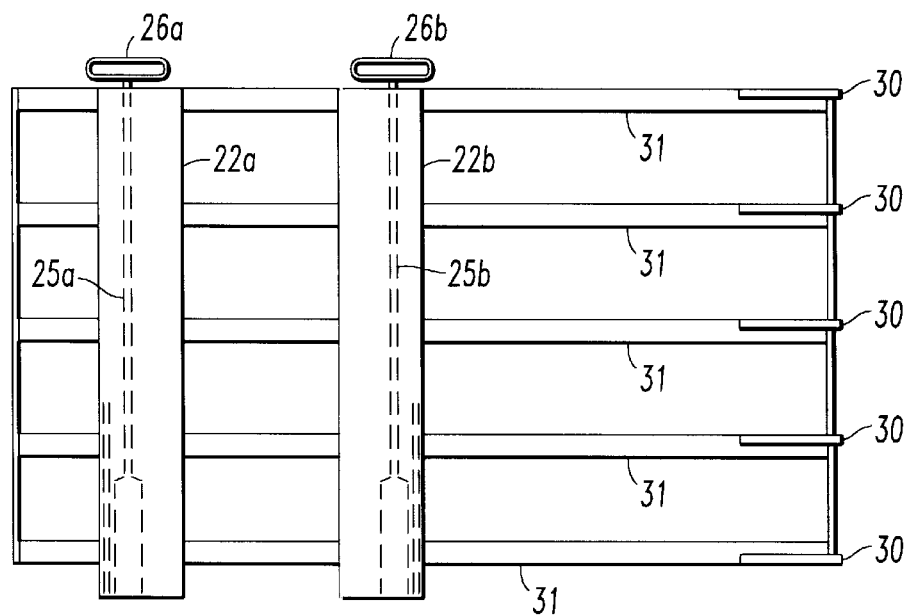
FIG. 6a is an embodiment utilizing a wall hinged single gate assembly having two locking pins.
Figure 6C:
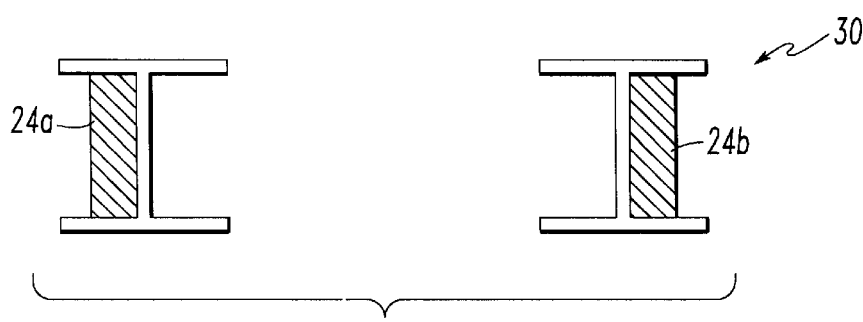

Such a single gate divider assembly is shown in FIGS. 6a, 6b and 6c. In FIG. 6a a single divider gate is shown which has two locking assemblies. As has previously been described a single gate divider may be utilized where the gate extends the full width of the cargo area, or only extends a partial way across the cargo area. It may be especially useful in some applications that the gate extend somewhere between halfway across the cargo width and the full width. Intermediate distances such as this provide a means to adequately secure and retain cargo within the divided areas and yet permit passage of personnel or other items around the dividers when they are in a transverse position from the wall.

As shown in FIG. 6a, the single gate assembly uses an embodiment in which the pivotal end of the gate assembly utilizes hinges 30 which connect to the side wall of the cargo vehicle. In the case of a railway freight car, hinges 30 would have two separate hinge portions, one affixed to the side wall of the vehicle and another affixed to the gate. The hinge assembly can also be hinge pin removable for adjustment within the car or for removal from the car in a manner that the specific car can be configured differently depending upon the given cargo loads. As has previously been described, the gate assemblies, even if single as shown in FIG. 6a, can be pivotally rotated from their transverse position to a position generally laying alongside the car wall. As such, cargo can be removed or inserted into the divided portions of the cargo bay area while the gate is pivoted adjacent to the side wall. Where a single gate is used it may be desirable to have two locking rod assemblies such as 26a and 26b. These may be positioned from the pivoting side of the gate such that they are generally equally spaced about the center line of the vehicle. The center line of the car is shown FIG. 6a.

As shown in FIG. 6b, the single gate mechanism having the hinge on one side can utilize two I-beam type construction members as the vertical center post members 22a, 22b. In some embodiments it may be desirable that each center post member have a separate locking pin arrangement such as shown in FIG. 6a. In other embodiments a single locking mechanism may be utilized. In the embodiments shown in FIGS. 6a and 6b it is contemplated that two locking pins would be used each having a separate handle member, 26a and 26b. In other embodiments a single locking and unlocking handle can be used to interlock both of the locking pin assemblies, 24a and 24b as shown in FIG. 6c.

FIG. 6a shows the gate assembly having five horizontal members 31 in this embodiment. While the single gate mechanism of FIG. 6a does not show a reinforcing plate as shown in other embodiments, such reinforcing plate can also be used on a single gate divider system.

In either the single gate or double gate divider systems it may be desirable to use other than a metallic plate on one or both sides of the divider. The embodiment shown in FIG. 6b shows the utilization of an airbag number 32 adjacent to the divider. The airbag can be used to further cushion cargo from the divider. In some applications it may be desirable to use two or more bags such as 32 and 33 shown in FIG. 6b such that the bags can be inflated to fit the specific cargo within the divided section. While the embodiment shown in FIG. 6b shows airbags or padding on only a single side of the divider gate, the invention can also be utilized having one or more airbags or cushioned inserts on both sides on the gate divider. FIG. 6c shows a locking pin assembly at the lower end of the center post members 22a and 22b. The locking pins 24a and 24b engage mating portions in the floor of the vehicle.

Figure 7A:
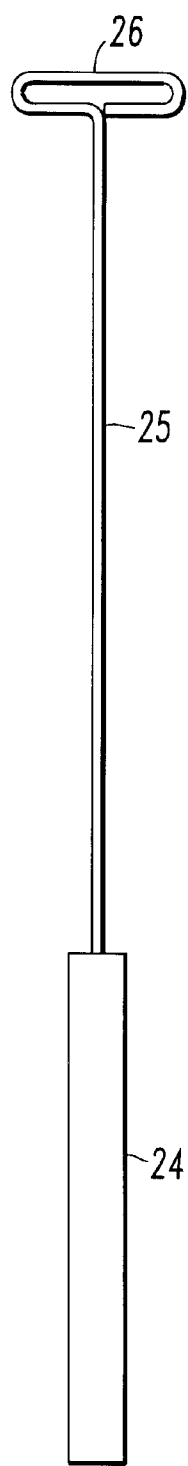
FIG. 7a shows a rectangular lift pin arrangement such as utilized in the embodiment shown in FIG. 6c.
Figure 7B:
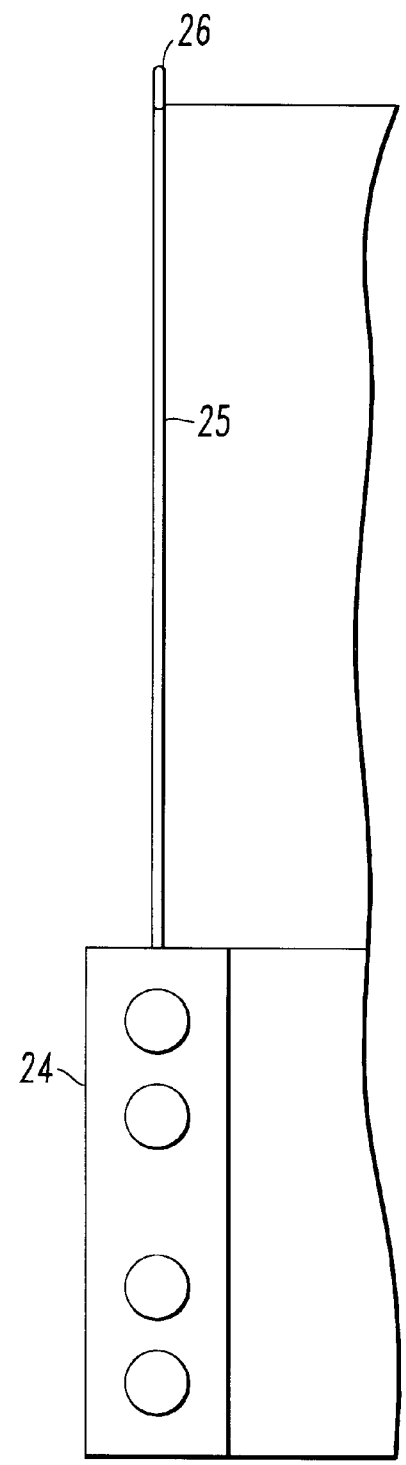
Figure 8A:
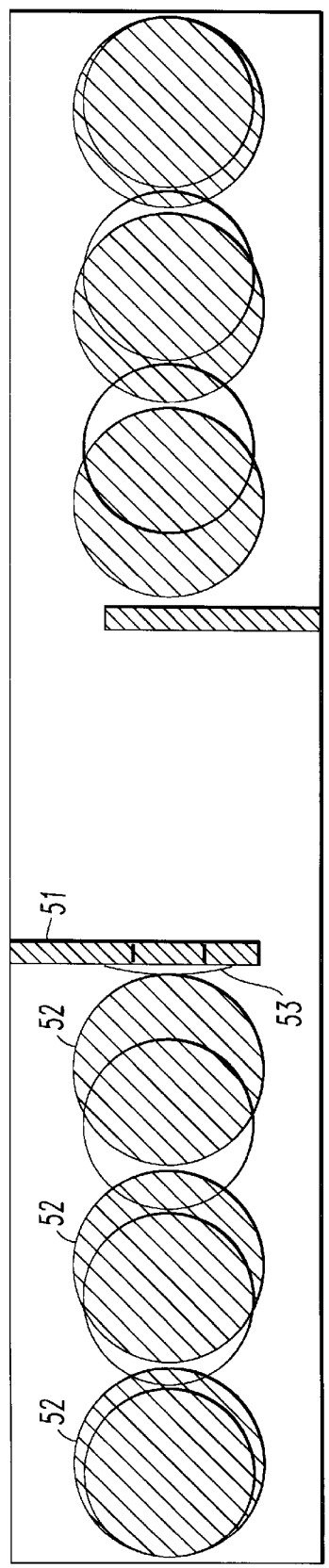
FIGS. 8a–d are diagrammatic representations of a cargo area using single gates with dual air bags.
Figure 8B:
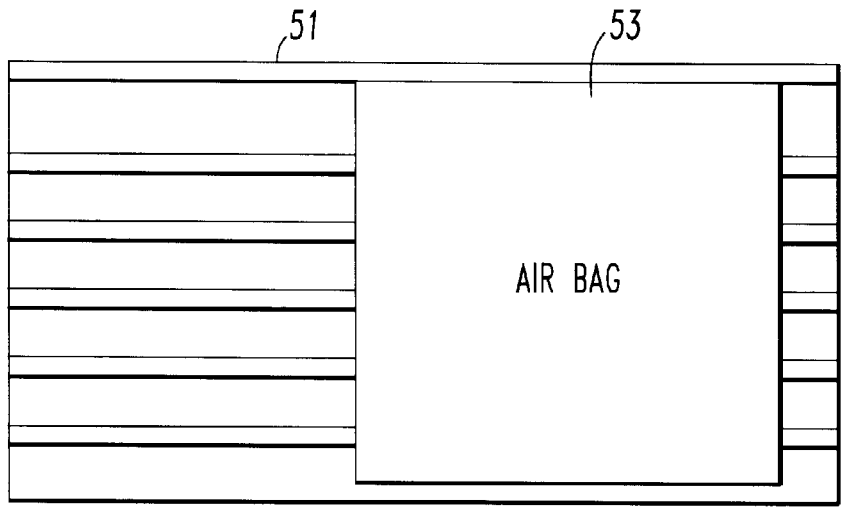
Figure 8C:
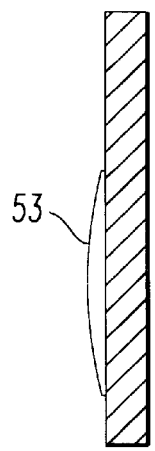
Figure 8D:
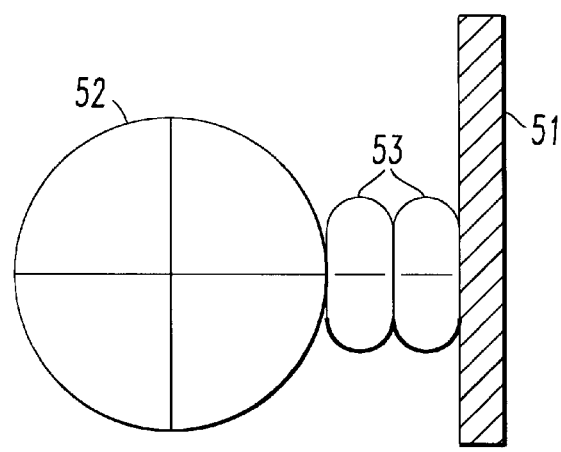

As shown in FIGS. 7a and 7b, the locking pin assemblies in this embodiment may be rectangular in cross section. The locking pin 24 in FIGS. 7a and 7b can be made of a rectangular steel plate. As shown in FIG. 7b, the locking pin may have holes placed in the flat surfaces for lightening so that the metal reduction reduces the overall weight and that the operating handle can more readily be manipulated. Depending on the load desired the locking pin 24 may extend from an inch to several inches into the mating floor channel or pocket so that the loads developed in the specific application are adequately provided for without bending or distortion. The rectangular locking pins of FIG. 7 have been shown in this embodiment to be used in a single gate divider whereas the circular locking pins of FIG. 5 have been shown to be used in double gate dividers systems. It is understood that both circular and rectangular locking pins and housing systems may be used interchangeably depending on the specific attributes of the vehicle and cargo. The wider load bearing surface of the rectangular system may be preferred in heavier metal coil cargo applications.

When it is desired to fit multiple coils or size varying cargo the previously described air bag system may be used. In use with multiple coils of metal or paper as cargo it has been desirable to use a four foot by four foot expandable air bag system on the face of a single divider gate. Such a cushioning system can be suspended with chain from the gate, and be a double chamber. Air bags for such a system are available from Engineered Fabrics Corporation of Rockmont, Ga. When utilized, a source of compressed air can expand the air bag or bags to extend or meet the cargo at the desired distance from the gate. The utilization of two such bags permits the expansion to adjust for various coil sizes by expanding to a combined distance of 29 inches. Such a system can also be used with non-coil cargo; including bagged goods such as cement, or manufacturing components.

FIGS. 8a–d are diagrammatic representations showing cargo floor plans using a single gate 51 with a double chain supported air bag system. Air bags 53 may be laminated together and used to expand to contact coils 52 adjacent the gate 51.

While certain embodiments of the invention have been shown and described, it will be apparent to those skilled in the art that other embodiments can equally utilize the invention as described herein.

We claim:

1. A load divider for use in a vehicle to divide cargo during transit in such vehicle, such vehicle having a cargo area with a pair of spaced side walls, a floor, and a center sill member, said load divider comprising:

a. at least one gate member;

b. pivot means at least partially on said gate member for pivoting said gate member into a position generally adjacent to one of said side walls and into a position generally transverse to said side walls;

c. at least one locking member on said gate member selectively locking said gate member in said position generally transverse to said side walls;

d. at least one retaining means mountable in said floor of said vehicle for engaging at least a portion of said locking member; and e. means for securing said retaining means to said center sill of said vehicle thereby strengthening the connection.

2. The load divider of claim 1 wherein said locking member comprises a locking post on said gate member with a locking pin selectively extendible from the bottom of said locking post to engage said retaining means.

3. The load divider of claim 2 wherein said pivot means comprises an end post on one end of said gate member.

4. The load divider of claim 3 further comprising a pivot socket engaging a portion of said end post and said pivot socket mountable in said floor of said vehicle adjacent said one side wall.

5. The load divider of claim 4 wherein said pivot means comprises at least one hinge portion on said gate attachable to said at least one side wall.

6. The load divider of claim 1 further comprising at least one load cushioning surface on at least one side of said gate.

7. The load divider of claim 6 wherein said cushioning surface comprises at least one inflatable airbag.

8. The load divider of claim 1 wherein said at least one gate member further comprises a plurality of said gate members each pivotable into a respective plane generally transverse to said pair of side walls and said respective planes being generally parallel to each other such that said cargo area is divided into a plurality of separate cargo areas.

9. The load divider of claim 1 having a plurality of said gates each pivotable into a respective plane generally transverse to said side wall and said respective planes being generally parallel to each other such that said cargo area is divided into a plurality of separate cargo areas.

10. The load divider of claim 1 wherein said at least one locking member includes two locking posts on said gate member spaced from pivot means.

11. The load divider of claim 10 wherein at least one of said locking posts is spaced from a center line of said center sill.

12. The load divided of claim 10 wherein both of said locking posts are spaced on opposite sides of a center line of said center sill.

13. The load divider of claim 11 wherein said divider includes a single gate extending a distance beyond said center line of said center sill and spaced from said side wall opposite said one side wall.

14. The load divider of claim 1 having two gates pivotable to extend into generally a common transverse plane.

\* \* \* \* \*